Sept. 25, 1951 P. FAY 2,569,373
DIE HEAD FOR MULTIPLE EXTRUSION
Filed Sept. 21, 1948 3 Sheets-Sheet 1

INVENTOR
PATRICK FAY
BY Henry P. Truesdell
ATTORNEY

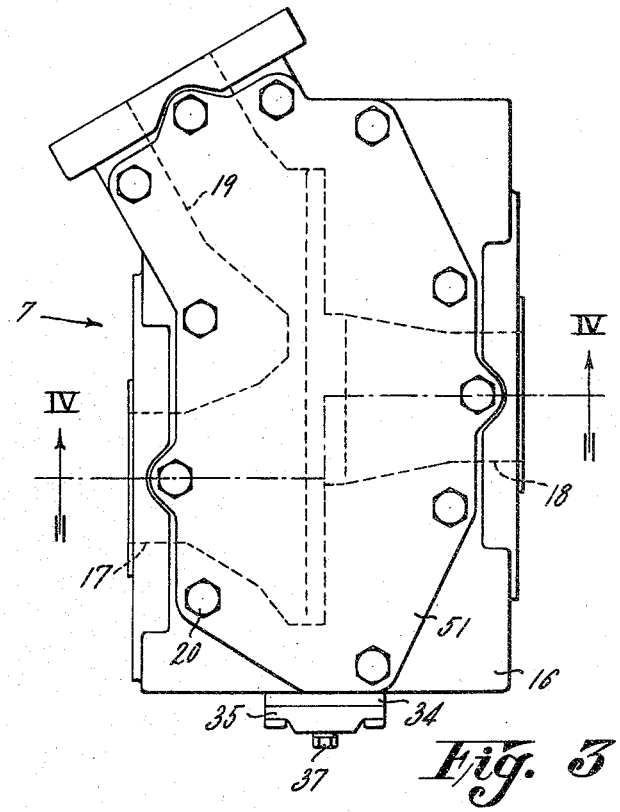
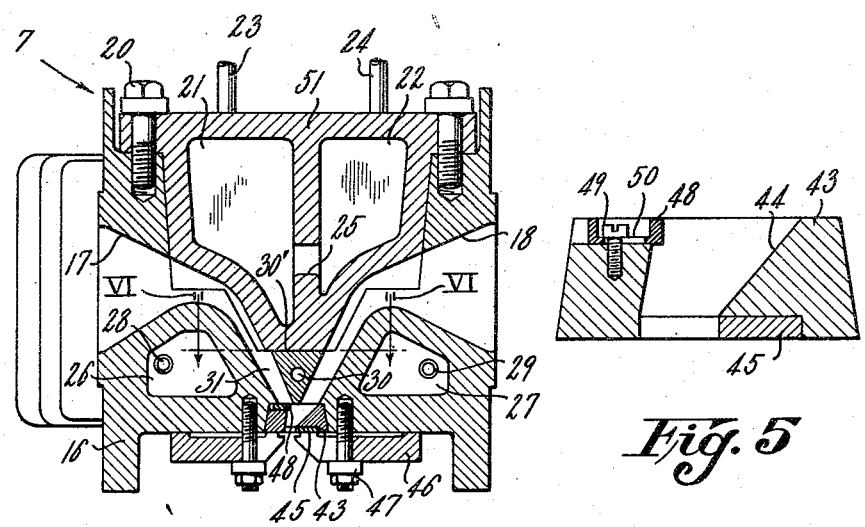
Fig. 3
Fig. 4
Fig. 5

Patented Sept. 25, 1951

2,569,373

UNITED STATES PATENT OFFICE 2,569,373

DIE HEAD FOR MULTIPLE EXTRUSION

Patrick Fay, Detroit, Mich., assignor to United States Rubber Company, New York, N. Y., a corporation of New Jersey Application September 21, 1948, Serial No. 50,327

14 Claims. (Cl. 18—13)

This invention relates to an apparatus for extruding plastic materials and, in particular, it relates to a die head for association with multiple tubers for extruding a composite product of resilient material.

In the manufacture of pneumatic tires, it is customary to extrude certain components of the pneumatic tire such as the tire tread. In many cases, it is desirable to form the tread of a rubber, or synthetic rubber, composition and in which different compositions are used in different portions of the tread. For example, the wear resisting portion of the tread may be formed of one composition, while the adjoining portions and side wall portions may be formed of a different composition. Still further, the use of different colors in the composition is sometimes desirable such as in the formation of white side wall tires.

In the manufacture of white side wall tires, it has been general practice to form the principal tread portion by the extrusion method. A white side wall strip is also extruded but in a separate operation. Thereafter the black tread portion and the white side wall portion are bonded together in spliced relationship. This is largely a manual task and the uniformity of the splice is not very satisfactory. The splice is frequently irregular in appearance and frequently separates during the manufacturing operation.

In accordance with the practice of my invention, I provide an apparatus in the form of a tuber die head which is capable of forming an integral tire tread in which the tread portion is formed of one rubber composition and one side wall portion including a layer underneath the tread portion is formed of a second rubber composition. I also include in the same extrusion operation one side wall portion which is formed of a white rubber composition united in homogeneous relationship with the remaining portion of the tread. The junction between the white and black portions of the tread is located at the side wall of the tire and its exact position is very critical and must be variable to suit different sizes of tires and different designs of the same size tires. Accordingly, I provide within the tuber die head an adjustable means for varying the location of the line of demarcation between the white and black rubber compositions.

The invention, therefore, contemplates an apparatus for forming tire treads from three different rubber compositions, including an adjustable positioning of a white or other colored rubber composition relative to the black composition. By this arrangement, it is possible to form a splice between the two compositions which will not separate during or after manufacturing operations. Uniformity in the positioning of the splice is also obtained. Furthermore, a reduction in labor is accomplished thereby making it possible to provide a better product on a more economical basis.

These and other objects and advantages will appear more fully in the following detailed description when considered in connection with the accompanying drawings in which:

Figure 3 is an enlarged plan view of a tuber die head;

Figure 4 is a transverse view in section of a tuber die head taken along lines IV—IV of Figure 3;

Figure 5 is an enlarged view in section of a preforming and final die assembly;

Figure 1:
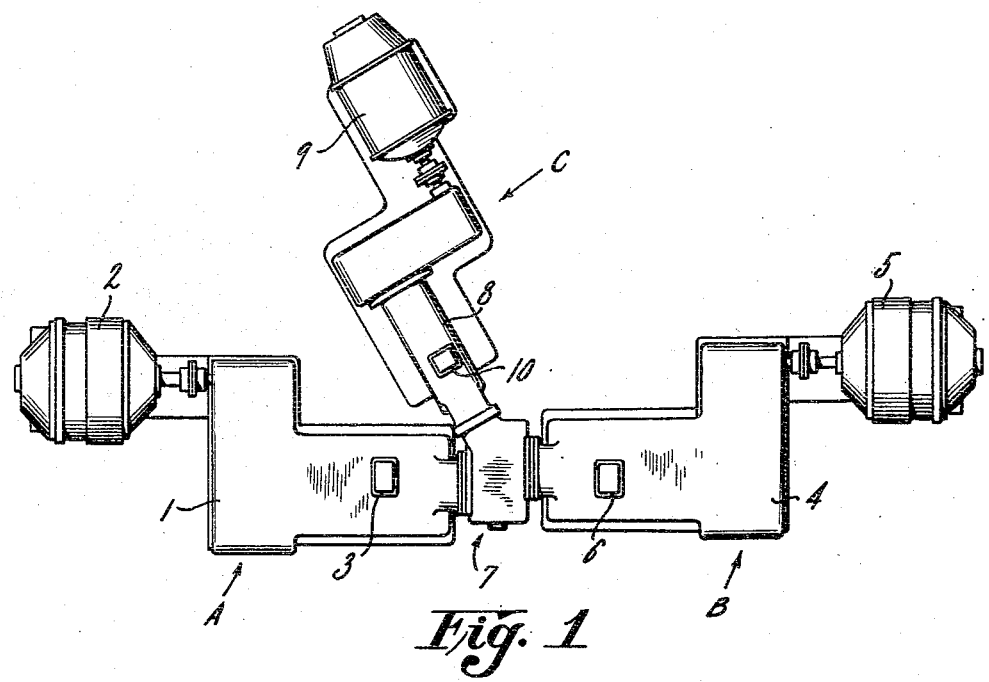
Figure 1 is a plan view of a complete assembly of an extrusion apparatus embodying the features of my invention.

With reference to the drawing and, in particular, to Figure 1, I show an embodiment of my invention including a plurality of tubers or extrusion devices. Each of these tubers is of conventional design and consists generally of a heavy duty motor capable of driving a feed screw positioned within a housing for the purpose of extruding plastic material through a fixed die.

As shown in Figure 1, the three tuber units are identified by the reference characters A, B and C. The tuber A comprises essentially a housing 1 and a heavy duty motor 2 adapted to drive a conventional feed screw within the housing 1. A feed opening 3 above the feed screw in the housing 1 provides for the entrance of rubber stock into the tuber. This rubber stock is usually supplied in the form of a continuous strip or ribbon.

The tuber B is identical with the tuber A in that it includes a housing 4, a motor 5 and a feed opening 6. The tubers A and B are opposed to each other and their extruding ends communicate with a common die head 7. As appears in the plan view, the tubers A and B are not in axial alinement for reasons which will appear more fully hereinafter.

The tuber C is also somewhat similar to the tubers A and B in that it includes a housing 8, a motor 9 and a feed opening 10. Because it is intended that the tuber C extrude a smaller strip, the tuber may be of smaller size and capacity. This tuber C also joins with the common die head 7 and at a point to one side of the horizontally opposed tubers A and B.

Figure 2:
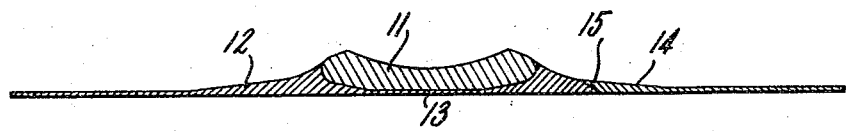
Figure 2 is a transverse view in section of a composite tread which is the resulting product of the apparatus of my invention.

The resulting product of the tuber combination is illustrated in Figure 2. This shows a transverse view of a tread adapted for application to a pneumatic tire. The tread consists of different components including a tread portion 11 formed of a particular rubber composition embodying wear resisting characteristics. One side of the tread constitutes a side wall portion 12. This portion also extends underneath the tread 11 and is referred to as a subtread 13. The composition of the portions 12 and 13 are similar and are particularly adapted to suit the requirements of the side wall portion of a tire and also the subtread which is not subjected to abrasion. That portion of the tread which is opposite the side wall portion 12 is formed of a different rubber composition 14. A particular example of the composition of the side wall portion 14 is a white rubber stock such as used in the formation of white side wall tires. This combination of rubber stocks results in the formation of a pneumatic tire having one white side wall and one black side wall. The junction 15 defines the line of demarcation between the white stock 14 and the adjoining black stocks of the tread. While reference is made to rubber compositions, it is to be understood that the invention contemplates the extrusion of rubber, synthetic rubber and combinations thereof, or other plastic materials which are capable of being extruded.

The tuber head assembly is shown particularly in Figures 3 and 4. The tuber head is connected to each of the tubers or extruders A, B and C. Horizontal cavities in the tuber head are connected with the respective extruder and merge with each other at a common opening at right angles thereto to form the composite tread as shown in Figure 2. The tuber head 7 is formed principally of an upper and lower portion 51 and 16, respectively. Cavities 17, 18 and 19 connect with the tubers A, B and C, respectively, and are formed, in part, in the upper and lower portions 51 and 16 of the tuber head 7. Bolts 20 fasten securely together the upper and lower portions 51 and 16 of the tuber head. The upper portion 51 of the tuber head is provided with chambers 21 and 22. Inlet and outlet conduits 23 and 24, respectively, permit water to be circulated through the chambers 21 and 22 so as to control the temperature of the tuber head. An opening 25 provides communication between the two chambers 21 and 22.

The lower portion 16 of the tuber head is also provided with chambers 26 and 27 which communicates with conduits 28 and 29 allowing for circulation of water for maintaining the tuber head at the desired temperature. The cavity 17 enters the die head 7 horizontally to form a cavity which bends downwardly and fans sideways so that the cavity forms in effect an elongated slot near the bottom portion of the die head. The cavity 18 connecting with the tuber B also provides an opening near the bottom of the die head in the form of an elongated slot.

The axial centers of the cavities 17 and 18, as well as the axial centers of the tubers A and B, are offset as appears in the plan view of Figure 3. The purpose of this offset relation is to permit a greater quantity of stock from the cavity 17 to be disposed on one side of the tread so as to constitute the portions 12 and 13 of the extruded tread. The cavity 18 is intended to form the tread portion 11 while the cavity 19 completes the tread by supplying the white rubber composition 14 for forming one of the side walls of the tread.

Figure 7:
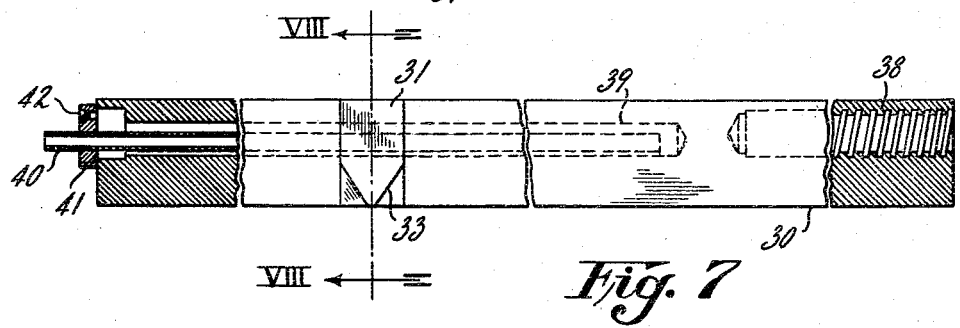
Figure 7 is a side elevational view, partly in section, of the adjustable die head portion; and, Figure 8 is a transverse view in section of the adjustable die head portion taken along lines VIII—VIII of Figure 7.
Figure 8:
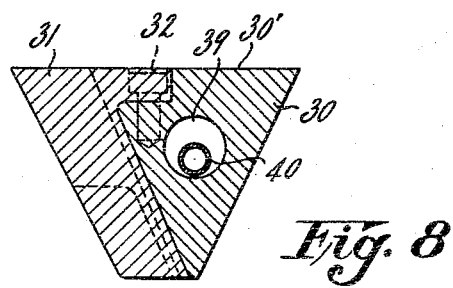

The line of demarcation indicated by the numeral 15 forms the junction between the white and black rubber compositions. Since it is necessary to locate this line of demarcation at different places along the side wall of the tread in order to accommodate different size tires and different design tires, it is essential to provide an adjustable means for varying the position of the line of demarcation 15. This is accomplished by providing a triangular shaped bar 30 adapted to extend the full length of the die opening and to form, in particular, a continuation of the walls of the cavities 17, 18 and 19. A flat portion or base 30' of the triangular member 30 rests against the underside of the upper portion 51 of the die head. The adjacent flat surfaces forming the continuation of the die head cavities terminate, and the various rubber compositions merge together, at the apex of the triangle of the member 30. A block 31 is attached to the triangular member 30 by means of machine screws 32. A part of the block 31 is tapered at 33 (Fig. 7) for defining the line of demarcation 15. The block 31 serves to form a wall between the cavities 17 and 19. By moving the triangular member 30 in a lengthwise direction, the block 31 which is attached thereto likewise moves and accordingly constitutes a wall variable in position between the cavities 17 and 19.

For adjusting the block 31 a pair of plates 34 and 35 are attached to the lower die head portion 16. These plates retain an adjusting screw 36 having a hexagonal shaped end portion 37 to which a hand tool may be applied for turning the screw 36 and adjustably moving the block 31. Screw threads 38 are provided at one end of the triangular member 30 for complementary engagement with the adjusting screw 36.

Since the triangular member 30 constitutes a relatively heavy block of metal, it is desirable to provide a cooling means or a means for heating the member during its initial operation. To accomplish this a bore 39 is formed in the triangular member 30 and a conduit 40 is extended therein to almost its entire length. A plate 41 closes the open end of the bore and another opening 42 is provided through the plate 41. By this arrangement water may be introduced into the opening 42 and circulated out through the conduit 40. Thus, a temperature control may be maintained in respect to the triangular member 30.

The cavity openings near the lowermost portion of the die head communicates with a preforming die 43. This preforming die includes a single cavity 44 through which the rubber stocks from the various cavities 17, 18 and 19 are forced. The preforming die converges the rubber composition in proper position to the final die 45. The final die 45 consists of a flat plate having an opening cut into one side substantially in accordance with the profile of the tread as shown in Figure 2. Both the preforming die and the final die are held in place by a plurality of clamps 46 and bolts 47.

A further adjustment attached to the preforming die 43 is a proportioning plate 48 attached to the preforming die by machine screws 49. Slots 50 in the proportioning plate allow for adjustment of the plate to narrow or enlarge the cavity at this point. Essentially the purpose of the proportioning plate is to control the thickness of the rubber stock 13 (Fig. 2) which constitutes the under tread of the tread assembly.

In the operation of the apparatus, hot water is first circulated throughout the various chambers in the die head in order to bring up the temperature of the head to approximately 175° F. This is necessary in order that the rubber compositions, will flow properly when being extruded through the cavities. Different types of rubber compositions are introduced into the tubular entrance openings 3, 6 and 8 as shown in Figure 1. The stock which is fed to these openings is usually in the form of a ribbon of predetermined size which is cut from a warming mill and fed continuously to the tubers during their operation. Each of the different rubber compositions is forced through the cavities until it merges with the others in the preforming die 43. Thereafter the final die 45 forms the desired profile of the tread such as shown in Figure 2.

As the tuber continues in operation, the flow of rubber through the cavities generates considerable heat in the die head and it becomes necessary to lower the temperatures of the water being introduced into the water circulating cavities. The temperature of the water introduced is such that the discharge temperature of the water will lie between 125° F. and 175° F.

Figure 6:
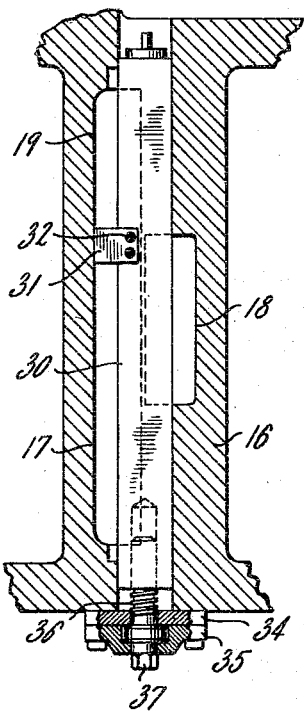
Figure 6 is a plan view in section taken along lines VI—VI of Figure 4 illustrating the adjustable portions of the die head.

As before stated, the location of the splice 15 (Fig. 2) is critical. As soon as the tuber begins the extruding operation, the proper location of the splice 15 may be measured and this line of demarcation may be varied by merely turning the hex nut 37 (Fig. 6) and the adjustment may be made while the tuber is in operation.

The adjustment for varying the thickness of the rubber composition 13 (Fig. 2) referred to as the under tread is made by varying the position of the proportioning plate 48 (Fig. 5). This adjustment can be made, however, only upon removal of the preforming die 43 and while the tuber is not in operation.

The die head of my invention results in an unusual combination for effecting the manufacture of composite treads in a highly efficient and economical manner. It is to be understood that the invention may be modified in accordance with the spirit of the invention and as appearing in the appended claims.

Having thus described my invention what I claim and desire to protect by Letters Patent is:

1. An apparatus for extruding composite materials comprising, a die head, a plurality of independent extruders connected with the die head, said die head having passageways communicating with each extruder, and each passageway communicating with a common opening, a sliding bar positioned between the termination of the passageways and the common opening, and a projection from said sliding bar forming a wall between two of the passageways for varying the location of the junction between said two passageways.

2. An apparatus for extruding composite materials comprising, a die head, a plurality of independent extruders connected with the die head, walls forming passageways in said die head, said passageways forming a communication with each extruder and terminating at a common opening, a wall portion positioned between two of said passageways for defining the junction between two compositions of the composite material and means connected to said wall portion extending to the outside of said die head for adjustably positioning said wall portion to vary the junction between said two passageways.

3. An apparatus for extruding composite materials comprising, a die head, a plurality of independent extruders connected with the die head, walls forming passageways in said die head, said passageways forming a communication with each extruder and terminating at a common opening, an adjustable wall portion positioned between two of said passageways for defining the junction between two compositions of the composite material, and means extending to the outside of the die head for varying the position of the adjustable wall portion.

4. An apparatus for extruding composite materials comprising, a die head, a plurality of independent extruders connected with the die head, walls forming passageways in said die head, said passageways forming a communication with each extruder and terminating at a common opening, and a plate within said die head between the termination of one of said passageways and the common opening and partially obstructing communication between said passageway and common opening, and means for adjusting the position of the plate for gauging the thickness of the composition passing through said passageway.

5. An apparatus for extruding composite materials comprising, a die head, a plurality of independent extruders connected with the die head, walls forming passageways in said die head, said passageways forming a communication with each extruder and terminating at a common opening, an adjustable proportioning plate in communication with one of the passageways for gauging the thickness of the composition passing through said passageway, an adjustable wall portion positioned between two of said passageways for defining the junction between two compositions of the composite material, and means for varying the position of the adjustable wall portion.

6. An apparatus for extruding composite materials comprising, a die head, a plurality of independent extruders connected with the die head, walls forming passageways in said die head, said passageways forming a communication with each extruder and terminating at a common opening, a separate block constituting a preforming die positioned at the common opening of the passageways, and an adjustable wall portion mounted between said common opening and said separate block and positioned between two of said passageways for defining the junction between two compositions of the composite material.

7. An apparatus for extruding composite materials comprising, a die head, a plurality of independent extruders connected with the die head, walls forming passageways in said die head, said passageways forming a communication with each extruder and terminating at a common opening, a separate block constituting a preforming die positioned at the common opening of the passageways, a proportioning plate adjustably attached to the preforming die for gauging the thickness of the composition passing through one of said passageways, and an adjustable wall portion positioned between two of said passageways for defining the junction between two compositions of the composite material.

8. An apparatus for extruding composite materials comprising, a die head, three independent extruders having their axes radially extending from and connected to the die head, said die head comprising a block including walls defining passageways horizontally communicating with each extruder and terminating in a common opening at right angles thereto, an upper member and a lower member constituting the die head block, a triangular shaped bar having its base resting against the upper member with its adjacent sides forming a continuation of the walls of said passageways, and a projection extending from the triangular shaped bar for forming a divisional wall between two of said passageways.

9. An apparatus for extruding composite materials comprising, a die head, three independent extruders having their axes radially extending from and connected to the die head, said die head comprising a block including walls defining passageways horizontally communicating with each extruder and terminating in a common opening at right angles thereto, an upper member and a lower member constituting the die head block, a triangular shaped bar having its base resting against the upper member with its adjacent sides forming a continuation of the walls of said passageways, a projection extending from the triangular shaped bar for forming a divisional wall between two of said passageways, and an adjusting means for moving the triangular shaped bar in a longitudinal direction for varying the position of the projection constituting the divisional wall between said passageways.

10. An apparatus for extruding composite materials comprising, a die head, three independent extruders having their axes radially extending from and connected to the die head, said die head comprising a block including walls defining passageways horizontally communicating with each extruder and terminating in a common opening at right angles thereto, an upper member and a lower member constituting the die head block, a separate block constituting a preforming die positioned at the common opening of the passageways, a triangular shaped bar interposed between the upper member and said separate block and having two of its sides forming a continuation of the walls of said passageways, and a projection extending from the triangular shaped bar for forming a divisional wall between two of said passageways.

11. An apparatus for extruding composite materials comprising, a die head, three independent extruders having their axes radially extending from and connected to the die head, said die head comprising a block including walls defining passageways horizontally communicating with each extruder and terminating in a common opening at right angles thereto, an upper member and a lower member constituting the die head block, a separate block constituting a preforming die positioned at the common opening of the passageways, a triangular shaped bar interposed between the upper member and said separate block and having two of its sides forming a continuation of the walls of said passageways, said triangular shaped bar having a bore therein, and a conduit communicating with the bore for circulating fluid through the bore.

12. An apparatus for extruding composite materials comprising, a die head, a plurality of independent extruders connected with the die head, said die head having passageways communicating with each extruder, and each passageway communicating with a common opening, an adjustable wall portion positioned between two of said passageways for defining the junction between two compositions of the composite material and means extending from said adjustable wall portion to the outside of the die head for varying the position of said adjustable portion.

13. An apparatus for extruding composite materials comprising, a die head, a plurality of independent extruders connected with the die head, walls forming passageways in said die head, said passageways forming a communication with each extruder and terminating at a common opening, a separate block constituting a preforming die positioned at the common opening of the passageways, an adjustable proportioning plate within said preforming die for gauging the thickness of the composition passing through one of said passageways, a final die plate in engagement with said preforming die, and an adjustable wall portion positioned between two of said passageways for defining the junction between two compositions of the composite material.

14. An apparatus for extruding composite materials comprising, a die head, three independent extruders having their axes radially extending from and connected to the die head, said die head comprising a block including walls defining passageways horizontally communicating with each extruder and terminating in a common opening at right angles thereto, the said die block being constituted of at least two separable members, a tapered member resting against one of the separable members, said tapered member having adjacent tapered sides forming a continuation of the walls of said passageways, and a dividing member extending transversely of the said tapered member for forming a divisional wall between two of said passageways.

PATRICK FAY.

REFERENCES CITED

The following references are of record in the file of this patent:

UNITED STATES PATENTS

| Number | Name | Date |
| --- | --- | --- |
| 1,952,469 | Snyder et al. | Mar. 27, 1934 |
| 2,096,362 | Lehman | Oct. 19, 1937 |
| 2,444,831 | Kilborn | July 6, 1948 |

FOREIGN PATENTS

| Number | Country | Date |
| --- | --- | --- |
| 138,557 | Great Britain | Feb. 12, 1920 |
| 423,380 | Great Britain | Jan. 31, 1935 |